US011924924B2

(12) United States Patent
Schnaare et al.

(10) Patent No.: US 11,924,924 B2
(45) Date of Patent: Mar. 5, 2024

(54) LOCATION AWARENESS SYSTEM

(71) Applicant: Rosemount Inc., Shakopee, MN (US)

(72) Inventors: Theodore Henry Schnaare, Carver, MN (US); Robert Karschnia, Chaska, MN (US); Cory Robinson, Mayer, MN (US); John Allan Kielb, Eden Priarie, MN (US); Robert Weinberger, Prior Lake, MN (US); Eric Russell Lovegren, Monticello, MN (US); Eric Darrell Rotvold, West St. Paul, MN (US); James A. Johnson, Savage, MN (US); Jared Neuharth, Shakopee, MN (US)

(73) Assignee: ROSEMOUNT INC., Shakopee, MN (US)

( * ) Notice: Subject to any disclaimer, the term of this patent is extended or adjusted under 35 U.S.C. 154(b) by 61 days.

(21) Appl. No.: 16/573,317

(22) Filed: Sep. 17, 2019

(65) Prior Publication Data
US 2020/0092950 A1 Mar. 19, 2020

Related U.S. Application Data

(60) Provisional application No. 62/732,094, filed on Sep. 17, 2018.

(51) Int. Cl.
*H04W 88/16* (2009.01)
*H02J 50/10* (2016.01)
(Continued)

(52) U.S. Cl.
CPC ............ *H04W 88/16* (2013.01); *H02J 50/10* (2016.02); *H04J 3/0655* (2013.01); *H04L 12/66* (2013.01); *H04L 67/04* (2013.01); *H04L 67/52* (2022.05)

(58) Field of Classification Search
CPC ......... H04W 88/16; H04W 4/02; H02J 50/10; H04J 3/0655; H04L 12/66; H04L 67/04; H04L 67/18; G01S 5/0289
See application file for complete search history.

(56) References Cited

U.S. PATENT DOCUMENTS 5,365,516 A 11/1994 Jandrell
5,455,851 A 10/1995 Chaco et al.
(Continued)

FOREIGN PATENT DOCUMENTS

CN 1659804 8/2005
CN 1841086 A 10/2006
(Continued)

OTHER PUBLICATIONS

Office Action from Chinese Patent Application No. 201710332471.6, dated Jun. 19, 2020.
(Continued)

*Primary Examiner* — Mohammad S Adhami
*Assistant Examiner* — Ji-Hae Yea
(74) *Attorney, Agent, or Firm* — Westman, Champlin & Koehler, P.A.

(57) ABSTRACT

A location awareness system including a communication network, and a network operating element coupled to the communication network. At least one anchor network gateway is coupled to the communication network, the at least one anchor network gateway configured to generate a wireless anchor network. A plurality of anchors are configured to couple to one of the at least one anchor network gateway via its respective wireless anchor network. A plurality of tags is each configured to communicate with at least one anchor to provide ranging information for determination of a position of the tag within an area covered by the system.

42 Claims, 11 Drawing Sheets

(51) Int. Cl.
  *H04J 3/06*      (2006.01)
  *H04L 12/66*     (2006.01)
  *H04L 67/04*     (2022.01)
  *H04L 67/52*     (2022.01)

(56) References Cited

U.S. PATENT DOCUMENTS

| | | |
|---|---|---|
| 5,491,670 A | 2/1996 | Weber |
| 5,526,357 A | 6/1996 | Jandrell |
| 5,544,171 A | 8/1996 | Godecker |
| 6,292,106 B1 | 9/2001 | Solinsky et al. |
| 6,492,906 B1 | 12/2002 | Richards et al. |
| 6,937,872 B2 | 8/2005 | Krasner |
| 7,016,688 B2 | 3/2006 | Simic et al. |
| 7,024,215 B2 | 4/2006 | Kranser |
| 7,423,576 B2 | 9/2008 | Sahinoglu et al. |
| 7,463,194 B1 | 12/2008 | Sahinoglu |
| 7,463,617 B2 | 12/2008 | Lamance et al. |
| 7,539,779 B2 | 5/2009 | Ha et al. |
| 7,706,754 B2 | 4/2010 | Krasner |
| 7,932,858 B2 | 4/2011 | Laine et al. |
| 7,995,644 B2 | 8/2011 | Sahinoglu et al. |
| 8,130,141 B2 | 3/2012 | Pattabiraman et al. |
| 8,175,613 B2 | 5/2012 | Patil et al. |
| 8,203,910 B2 | 6/2012 | Zhao et al. |
| 8,330,605 B2 | 12/2012 | Johnson, Jr. et al. |
| 8,400,317 B2 | 3/2013 | Johnson, Jr. et al. |
| 8,484,704 B2 | 7/2013 | Chavez et al. |
| 8,548,490 B2 | 10/2013 | Wang et al. |
| 8,766,794 B2 | 7/2014 | Ferguson et al. |
| 8,773,309 B2 | 7/2014 | Kawaguchi et al. |
| 8,792,387 B2 | 7/2014 | Georgis et al. |
| 8,811,199 B2 | 8/2014 | Nixon et al. |
| 8,837,307 B2 | 9/2014 | Ekbal et al. |
| 8,912,949 B2 | 12/2014 | Hirata et al. |
| 9,014,181 B2 | 4/2015 | Lakshman et al. |
| 9,091,746 B2 | 7/2015 | Fischer et al. |
| 9,209,909 B2 | 12/2015 | Booij et al. |
| 9,213,082 B2 | 12/2015 | Aggarwal et al. |
| 9,397,817 B2 | 7/2016 | Park |
| 9,454,744 B2 | 9/2016 | Imming et al. |
| 9,557,402 B2 | 1/2017 | Bartov et al. |
| 10,069,638 B2 | 9/2018 | Lim |
| 10,386,450 B2 | 8/2019 | Yang |
| 2001/0004601 A1 | 6/2001 | Drane et al. |
| 2004/0166873 A1 | 8/2004 | Simic et al. |
| 2005/0002481 A1 | 1/2005 | Woo et al. |
| 2006/0029009 A1 | 2/2006 | Alapuranen et al. |
| 2006/0133556 A1 | 6/2006 | Sarkar |
| 2007/0162185 A1 | 7/2007 | McFarland |
| 2008/0018521 A1 | 1/2008 | Sahinoglu et al. |
| 2008/0032705 A1 | 2/2008 | Patel et al. |
| 2008/0232281 A1 | 9/2008 | Pahlavan et al. |
| 2009/0009327 A1* | 1/2009 | Amidi ............... H04W 4/20 340/568.1 |
| 2009/0070797 A1 | 3/2009 | Ramaswamy |
| 2009/0190441 A1 | 7/2009 | Zhao et al. |
| 2009/0201850 A1 | 8/2009 | Davis et al. |
| 2009/0295639 A1 | 12/2009 | Zhao |
| 2010/0109849 A1 | 5/2010 | Wang et al. |
| 2010/0148940 A1* | 6/2010 | Gelvin ............... H04L 67/12 340/286.02 |
| 2010/0172339 A1 | 7/2010 | Duan et al. |
| 2010/0278060 A1 | 11/2010 | Lee et al. |
| 2010/0290359 A1 | 11/2010 | Dewey et al. |
| 2011/0037599 A1 | 2/2011 | Johnson, Jr. et al. |
| 2011/0110242 A1 | 5/2011 | Nixon et al. |
| 2011/0216658 A1 | 9/2011 | Etkin et al. |
| 2012/0044786 A1 | 2/2012 | Booij et al. |
| 2012/0087272 A1 | 4/2012 | Lemkin et al. |
| 2012/0165012 A1 | 6/2012 | Fischer et al. |
| 2012/0280818 A1 | 11/2012 | Johnson, Jr. et al. |
| 2013/0050080 A1 | 2/2013 | Dahl |
| 2013/0057434 A1 | 3/2013 | Krasner et al. |
| 2013/0057436 A1 | 3/2013 | Krasner et al. |
| 2013/0060351 A1 | 3/2013 | Imming et al. |
| 2013/0223261 A1 | 8/2013 | Aggarwal et al. |
| 2013/0237246 A1 | 9/2013 | Aggarwal et al. |
| 2013/0288692 A1 | 10/2013 | Dupray et al. |
| 2013/0316728 A1 | 11/2013 | Bradley |
| 2014/0253388 A1* | 9/2014 | Jalali ............... G01S 5/14 342/458 |
| 2014/0274181 A1* | 9/2014 | Lovegren ............... H04W 52/0203 455/73 |
| 2015/0091702 A1 | 4/2015 | Gupta et al. |
| 2015/0234033 A1 | 8/2015 | Jamieson |
| 2015/0247916 A1 | 9/2015 | Bartov et al. |
| 2015/0268327 A1 | 9/2015 | Neukirch |
| 2015/0319572 A1 | 11/2015 | Jalai et al. |
| 2016/0205750 A1 | 7/2016 | Lim |
| 2017/0131383 A1* | 5/2017 | Bartov ............... G01S 13/765 |
| 2017/0350957 A1 | 12/2017 | Yang |
| 2019/0357164 A1* | 11/2019 | Truong ............... H04W 24/10 |

FOREIGN PATENT DOCUMENTS

| | | |
|---|---|---|
| CN | 11841086 | 10/2006 |
| CN | 1963561 A | 5/2007 |
| CN | 101498781 A | 8/2009 |
| CN | 101526601 A | 9/2009 |
| CN | 101592727 A | 12/2009 |
| CN | 102204396 | 9/2011 |
| CN | 102265174 | 11/2011 |
| CN | 102378918 | 3/2012 |
| CN | 102642776 | 8/2012 |
| CN | 102714855 | 10/2012 |
| CN | 102985841 | 3/2013 |
| CN | 103648164 | 3/2014 |
| CN | 102118849 B * | 4/2014 |
| CN | 103947280 | 7/2014 |
| CN | 204439827 U | 7/2015 |
| CN | 104898090 | 9/2015 |
| CN | 105659705 | 6/2016 |
| CN | 106650847 | 5/2017 |
| CN | 106961725 | 7/2017 |
| CN | 207219045 | 4/2018 |
| CN | 108112070 | 6/2018 |
| CN | 108363035 | 8/2018 |
| CN | 108490391 | 9/2018 |
| EP | 1992964 A2 | 11/2008 |
| EP | 1992964 A3 | 2/2011 |
| JP | 05-297117 H | 11/1993 |
| JP | H07-502153 | 3/1995 |
| JP | 2006-507500 | 3/2006 |
| JP | 2006-518974 | 8/2006 |
| JP | 2007-501383 | 1/2007 |
| JP | 2008-026310 | 2/2008 |
| JP | 2009-505060 | 2/2009 |
| JP | 2009288245 A | 12/2009 |
| JP | 2010-175535 | 8/2010 |
| JP | 2010-204028 | 9/2010 |
| JP | 2010-213279 | 9/2010 |
| JP | 2011-080946 | 4/2011 |
| JP | 2011-232043 | 11/2011 |
| JP | 2013-055662 | 3/2013 |
| JP | 2013-510307 | 3/2013 |
| JP | 2013-533956 | 8/2013 |
| JP | 2013-195405 | 9/2013 |
| JP | 2014-179697 | 9/2014 |
| JP | 2015-232564 | 12/2015 |
| JP | 2016-510926 | 4/2016 |
| JP | 2016-131368 | 7/2016 |
| JP | 2017-537326 | 12/2017 |
| JP | 2018-056713 | 4/2018 |
| KR | 2003-0000582 | 1/2003 |
| KR | 2006-0092984 | 8/2006 |
| KR | 2011-0030404 | 3/2011 |
| RU | 2008 119 347 | 11/2009 |
| RU | 2 383 898 C2 | 3/2010 |
| RU | 2011 120 814 | 11/2012 |
| WO | 9304453 A1 | 3/1993 |
| WO | WO 01/73710 | 10/2001 |

(56) References Cited

FOREIGN PATENT DOCUMENTS

| WO | WO 2008/065691 | 6/2008 |
|---|---|---|
| WO | WO 2015/047986 | 4/2015 |
| WO | WO 2015/134269 A2 | 9/2015 |

OTHER PUBLICATIONS

Office Action from Canadian Patent Application No. 3,023,588, dated Aug. 4, 2020.
Office Action from U.S. Appl. No. 15/416,004, dated Jul. 24, 2018.
Office Action from U.S. Appl. No. 15/416,004, dated Apr. 4, 2019.
Office Action from U.S. Appl. No. 15/416,004, dated May 21, 2020.
Office Action from U.S. Appl. No. 15/416,017, dated Sep. 17, 2020.
Final Office Action from U.S. Appl. No. 15/416,017, dated Jan. 10, 2020.
Final Office Action from U.S. Appl. No. 15/416,004, dated Jan. 9, 2020.
Office Action from U.S. Appl. No. 15/416,004, dated Sep. 19, 2019.
Notification of Transmittal of the International Search Report and the Written Opinion of the International Searching Authority from PCT/US2015/017720, dated Oct. 7, 2015.
Priyantha et al, "The Cricket Location-Support System", Proceedings of the Sixth Annual ACM/IEEE International Conference on Mobile Computing and Networking, pp. 32-43, dated Aug. 1, 2000, 12 pages.
"An Advertising Supplement to Control Wired & Wireless HART Communication", Putman Media, Sep. 2013.
Invitation to Pay Additional Fees and, Where Applicable, Protest Fee and Partial International Search, from PCT/US2015/017720, dated Jun. 9, 2015.
Office Action from Chinese Patent Application No. 201410738708.7, dated Jan. 10, 2017.
Office Action from U.S. Appl. No. 14/493,730, dated Feb. 16, 2016.
Office Action from U.S. Appl. No. 14/493,730, dated Jun. 23, 2016.
Second Office Action from Chinese Patent Application No. 201410738708.7, dated Sep. 13, 2017, 16 pages.
Rejection Notice from Japanese Patent Application No. 2016-555495, dated Aug. 2, 2017, 10 pages.
Invitation to Pay Additional Fees from PCT/US2017/030508, dated Aug. 24, 2017, 12 pages.
Notification Of Transmittal Of The International Search Report And The Written Opinion Of The International Searching Authority from PCT/US2017/030512, dated Sep. 8, 2017, 13 pages.
"Wireless Medium Access Control (MAC) and Physical Layer (PHY) Specifications for Low-Rate Wireless Person Area Networks (LR-WPANs)", IEEE Stand for Information Technology—Telecommunications and Information Exchange Between Systems—Local and Metropolitan Area Networks—Specific Requirements, dated Oct. 1, 2003, 680 pages.
"Low-Rate Wireless Personal Area Networks (LR-WPANs)", IEEE Standard for Local and Metropolitan Area Networks, 802.15.4-2011, 1-314, dated Sep. 5, 2011, 314 pages.
First Office Action from Chinese Patent Application No. 201720524582.2, dated Nov. 20, 2017, 3 pages.
First Office Action from Chinese Patent Application No. 201720524635.0, dated Nov. 20, 2017, 2 pages.
Communication pursuant to Rules 161(1) and 162 EPC from European Application No. 15709589.4, dated Nov. 10, 2016, 2 pages.
International Search Report and Written Opinion from International Patent Application No. PCT/US2017/030508, dated Dec. 20, 2017, 15 pages.
Office Action from Chinese Patent Application No. 201720524582.2, dated Mar. 14, 2018.
Office Action from Japanese Patent Application No. 2016-555495, dated Mar. 22, 2018.
Office Action from Chinese Patent Application No. 201410738708.7, dated Mar. 30, 2018.
Office Action from U.S. Appl. No. 15/416,017, dated Sep. 7, 2018.
Office Action from Japanese Patent Application No. 2016-555495, dated Oct. 17, 2018.
Communication from European Patent Application No. 17733198.0, dated Dec. 12, 2018.
Communication from European Patent Application No. 17722963.0, dated Dec. 19, 2018.
Reexamination Notification from Chinese Patent Application No. 201710738708.7, dated Jan. 15, 2019.
Communication from European Patent Application No. 15709589.4, dated Feb. 19, 2019.
First Examination Report from Indian Patent Application No. 201627027925, dated Mar. 28, 2019.
Office Action from Russian Patent Application No. 2018143829, dated Mar. 6, 2019.
Office Action from Chinese Patent Application No. 201410738708.7, dated May 8, 2019.
Office Action from U.S. Appl. No. 15/416,017, dated Apr. 5, 2019.
Office Action from Russian Patent Application No. 2018143828, dated Aug. 9, 2019.
Examination Report from Australian Application No. 2017262492, dated Sep. 16, 2019.
Office Action from Chinese Patent Application No. 201710332366.2, dated Sep. 18, 2019.
Office Action from Canadian Patent Application No. 3,023,494, dated Oct. 16, 2019.
Office Action from Japanese Patent Application No. 2016-555495, dated Oct. 23, 2019.
Office Action from Canadian Patent Application No. 3,023,588, dated Nov. 7, 2019.
Office Action from Chinese Patent Application No. 201710332471.6, dated Nov. 12, 2019.
Examination Report No. 1 from Australian Patent Application No. 2017262491, dated May 1, 2019.
Office Action from U.S. Appl. No. 15/416,017, dated Sep. 19, 2019.
Examination Report No. 2 from Australian Patent Application No. 2017262491, dated Feb. 6, 2020.
Office Action from Korean Patent Application No. 10-2018-7033848, dated Mar. 10, 2020.
Office Action from Japanese Application No. 2018-559835, dated Feb. 12, 2020.
Office Action from Korean Patent Application No. 10-2018-2017033408, dated Mar. 24, 2020.
Office Action from Japanese Patent Application No. 2018-559825, dated Feb. 4, 2020.
Office Action from Indian Patent Application No. 201827041700, dated Jul. 19, 2020.
Examination Report from Australian Patent Application No. 2017262492, dated Jun. 12, 2020.
Examination Report from Australian Patent Application No. 2017262492, dated Sep. 9, 2020.
Office Action from Chinese Patent Application No. 201710332366.2, dated Jul. 31, 2020.
Examination Report from Indian Patent Application No. 201827041343, dated Aug. 24, 2020.
Communication from European Patent Application No. 17733198.0, dated Sep. 1, 2020.
Notice of Reasons for Rejection from Japanese Patent Application No. 2018-559825, dated Oct. 26, 2020.
Communication from European Patent Application No. 17722963.0, dated May 17, 2021.
Office Action from Chinese Patent Application No. 201710332366.2, dated Jun. 3, 2021.
Office Action from Mexican Application No. MX/a/2018/013722, dated Aug. 2, 2021.
Examination Report from Indian Patent Application No. 202127009335, dated Aug. 31, 2021.
Second Office Action from Chinese Patent Application No. 201980002609.3, dated Sep. 3, 2021.
Office Action from Chinese Patent Application No. 201980002609.3, dated Dec. 21, 2020.
Office Action from Chinese Patent Application No. 201710332471.6, dated Dec. 21, 2020.

(56) References Cited

OTHER PUBLICATIONS

KIPO Refusal Decision from Korean Patent Application No. 10-2018-7033848, dated Dec. 16, 2020.
Office Action from Chinese Patent Application No. 201710332366.2, dated Feb. 3, 2021.
Mexican Patent Application No. MX/a/2018/013722, dated Dec. 9, 2020.
Office Action from U.S. Appl. No. 15/416,017, dated Jan. 26, 2021.
Communication Pursuant to Rules 161(1) and 162 EPC from European Application No. 19780065.9, dated Apr. 12, 2021.
Notification of Transmittal of the International Search Report and the Written Opinion of the International Searching Authority from International Application No. PCT/US2019/051474, dated Nov. 25, 2019.
Examination Report No. 1 from Australian Patent Application No. 2020233659, dated Aug. 2, 2021.
Examination Report No. 1 from Australian Patent Application No. 2019345251, dated Oct. 1, 2021.
Examination Report No. 2 from Australian Patent Application No. 2019345251, dated Dec. 16, 2021.
Office Action from Chinese Patent Application No. 201710332366.2, dated Mar. 31, 2022.
Office Action from Canadian Patent Application No. 3,112,570, dated Apr. 7, 2022.
Office Action from Chinese Patent Application No. 201980002609.3, dated Mar. 3, 2022.
Communication from Canadian Patent Application No. 3,112,570, dated Jan. 4, 2023.
Re-Examination from Chinese Patent Application No. 201980002609.3, dated Jan. 13, 2023.
Office Action from Japanese Patent Application No. 2021-514600, dated Dec. 28, 2022.
Office Action from Chinese Patent Application No. 201910552148.9, dated Nov. 4, 2022.
Office Action from European Patent Application No. 17722963.0, dated Jan. 19, 2023.
Rejection Decision from Chinese Patent Application No. 201980002609.3, dated Jun. 6, 2022.
Rejection Notice from Japanese Patent Application No. 2021-514600, dated Jun. 29, 2022.
Nokia Networks, FS_SMarter_CriC TR 22.xxx vo.2.0 to include agreements at this meeting, S1-154453, dated Nov. 16-20, 2015.
Examination Report No. 3 from Australian Patent Application No. 2019345251, dated Aug. 15, 2022.
Office Action from U.S. Appl. No. 17/163,791, dated Jun. 8, 2022.
Notice of Refusal from Korean Patent Application No. 10-2018-7033848, dated Mar. 10, 2020.
Third Office Action from Chinese Patent Application No. 201710332366.2, dated Feb. 24, 2021.
Reexamination Notice from Chinese Patent Application No. 20170332366.2, dated Jul. 22, 2022.
Office Action from Canadian Patent Application No. 3,023,588, dated May 6, 2021.
Examination Report 1 from Australian Patent Application No. 2022241595, dated Mar. 29, 2023.
Examination Report from Canadian Patent Application No. 3,023,588, dated Jan. 16, 2023.
Hearing Notice from Indian Patent Application No. 201627027925, dated Jan. 30, 2023.
Office Action from U.S. Appl. No. 17/163,791, dated Dec. 6, 2022.
Office Action from Chinese Application No. 201910552148..9, dated Jun. 9, 2023.
Office Action from U.S. Appl. No. 17/163,791, dated Jun. 9, 2023.
Communication from European Patent Application No. 19780065.9, dated May 10, 2023.
Office Action from Chinese Patent Application No. 201980002609.3, dated Jun. 1, 2023, Google translation.
Office Action from Canadian Application No. 3,112,570, dated Oct. 19, 2023.
Hearing Notice from Indian Patent Application No. 202127009335, dated Jan. 4, 2024.

* cited by examiner

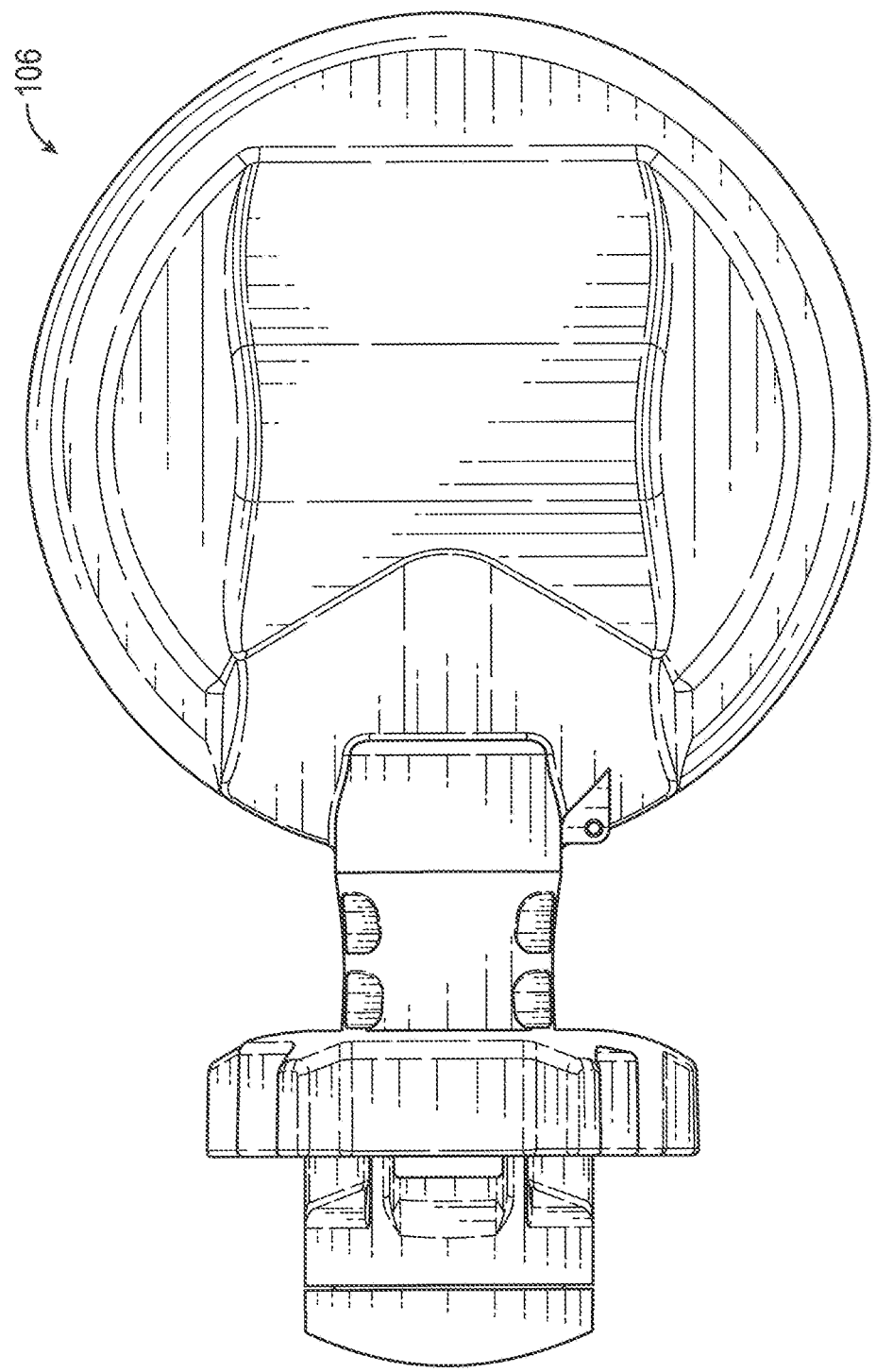

LOCATION AWARENESS SYSTEM

CROSS-REFERENCE TO RELATED APPLICATION

The present application is based on and claims the benefit of U.S. provisional patent application Ser. No. 62/732,094, filed Sep. 17, 2018, the content of which is hereby incorporated by reference in its entirety.

BACKGROUND

Industrial plant operators need a simple, cost effective and accurate means for maintaining location awareness of personnel and critical assets within their facilities. Typical use cases include safety mustering, man-down detection, mobile worker enhancements (for example location aware augmented reality), geo fencing, plant security and many others. Current location awareness solutions are costly to purchase and install and often require months to fine tune to the characteristics of the local environment. Even after tuning, physical and environmental plant changes over time can degrade the accuracy of the system. Global Positioning Systems (GPS) are not suitable for indoor position monitoring or in outdoor heavy infrastructure.

A Positioning System (PS) is a network of devices used to wirelessly locate objects or people inside a building or within dense industrial areas. A special design is required since global positioning system (GPS) systems are typically not suitable to establish indoor locations or other crowded locations as they require an unobstructed line of sight to four or more GPS satellites. Microwaves will be attenuated and scattered by roofs, walls and other objects and multiple reflections at surfaces cause multipath propagation serving for uncontrollable errors.

Ranging may use one or more of a variety of methods, but they may require a complicated synchronization mechanism to maintain a reliable source of time for sensors, or suffer from large multipath conditions in localization situations with dense populations, such as indoor locations and industrial environments which can be crowded, which is caused by the reflection and diffraction of the RF signal from objects.

Due to the attenuation and reflections caused by construction materials, it is desirable to have an unobstructed line of sight to at least three anchor points at any location that should be covered by the system. As a result, a larger number of anchor stations are required.

SUMMARY

A location awareness system including a communication network, and a network operating element coupled to the communication network. At least one anchor network gateway is coupled to the communication network, the at least one anchor network gateway configured to generate a wireless anchor network. A plurality of anchors are configured to couple to one of the at least one anchor network gateway via its respective wireless anchor network. A plurality of tags is each configured to communicate with at least one anchor to provide ranging information for determination of a position of the tag within an area covered by the system.

A method of position location of a plurality of tags in a system includes providing a first network with a network operating element coupled to the first network, and providing at least one anchor network gateway coupled to the first network, the at least one anchor network gateway providing an anchor network. A network of a plurality of fixed position anchors is formed and configured to communicate via ranging with the plurality of tags and via the at least one anchor network to the at least one anchor network gateway. The system is operated using accurate timing within networked wireless communication protocols to provide a global location network schedule for the system.

A method of ranging a plurality of tags in a system includes using accurate timing of an existing industrial time division multiple access wireless communication protocol to provide a global location network schedule for the system. The method further includes providing a plurality of anchor networks via a plurality of network anchor gateways, and providing a plurality of fixed location anchors coupled to at least one of the plurality of anchor networks, the plurality of anchors providing a plurality of tag to anchor networks. The plurality of tags, plurality of anchors, the anchor networks, and the tag to anchor networks have a shared sense of time.

A location awareness system includes a plurality of tags, a plurality of anchors, and a plurality of anchor network gateways for communication between tags and anchors, the plurality of network anchor gateways providing a plurality of anchor networks, and the plurality of anchors providing a plurality of anchor to tag networks. A network operating element is coupled to the plurality of anchor network gateways, the network operating element configured to range the plurality of tags. The plurality of tags is ranged using a method of using accurate timing of an existing industrial time division multiple access wireless communication protocol to provide a global location network schedule for the system. The plurality of tags, plurality of anchors, the anchor networks, and the anchor to tag networks have a shared sense of time.

BRIEF DESCRIPTION OF THE DRAWINGS

FIG. 4B is a rear elevation of the location anchor design of FIG. 4A.

DETAILED DESCRIPTION OF ILLUSTRATIVE EMBODIMENTS

The present disclosure provides embodiments of a location awareness system for achieving location awareness of assets and/or personnel within a typical industrial plant is provided. Awareness of the location of critical assets within an industrial plant is an important element in the safe and efficient operation of the plant. Currently available systems are costly, complex, and do not provide the performance required by typical industrial plant operators. This disclosure builds on existing technology to provide a simple to deploy, relatively low cost, accurate location awareness system.

Many industrial environments use low power industrial communications networks for communication of various components and elements within the industrial environment. Embodiments of the present disclosure build on such existing low power industrial communication and ranging technologies to achieve a location awareness system that performs better than existing solutions at a reduced cost of ownership.

A general positioning system (PS) (e.g., system 100 described further below) comprises a network of devices used to wirelessly locate objects or people inside a building or within dense industrial areas. A special design is required since global positioning system (GPS) systems are typically not suitable to establish indoor locations or other crowded locations as they require an unobstructed line of sight to four or more GPS satellites. The GPS signal or the RF signal used for GPS will be attenuated and scattered by roofs, walls and other objects and multiple reflections at surfaces cause multipath propagation serving for uncontrollable errors.

Ranging methods that may be employed in embodiments of the present disclosure include time of flight (ToF), Time Difference of Arrival, Angle of Arrival, signal strength, phase angle measurement, etc. The choice of a ranging method may depend on conditions and desired accuracy and ease of implantation, for example.

Figure 1:
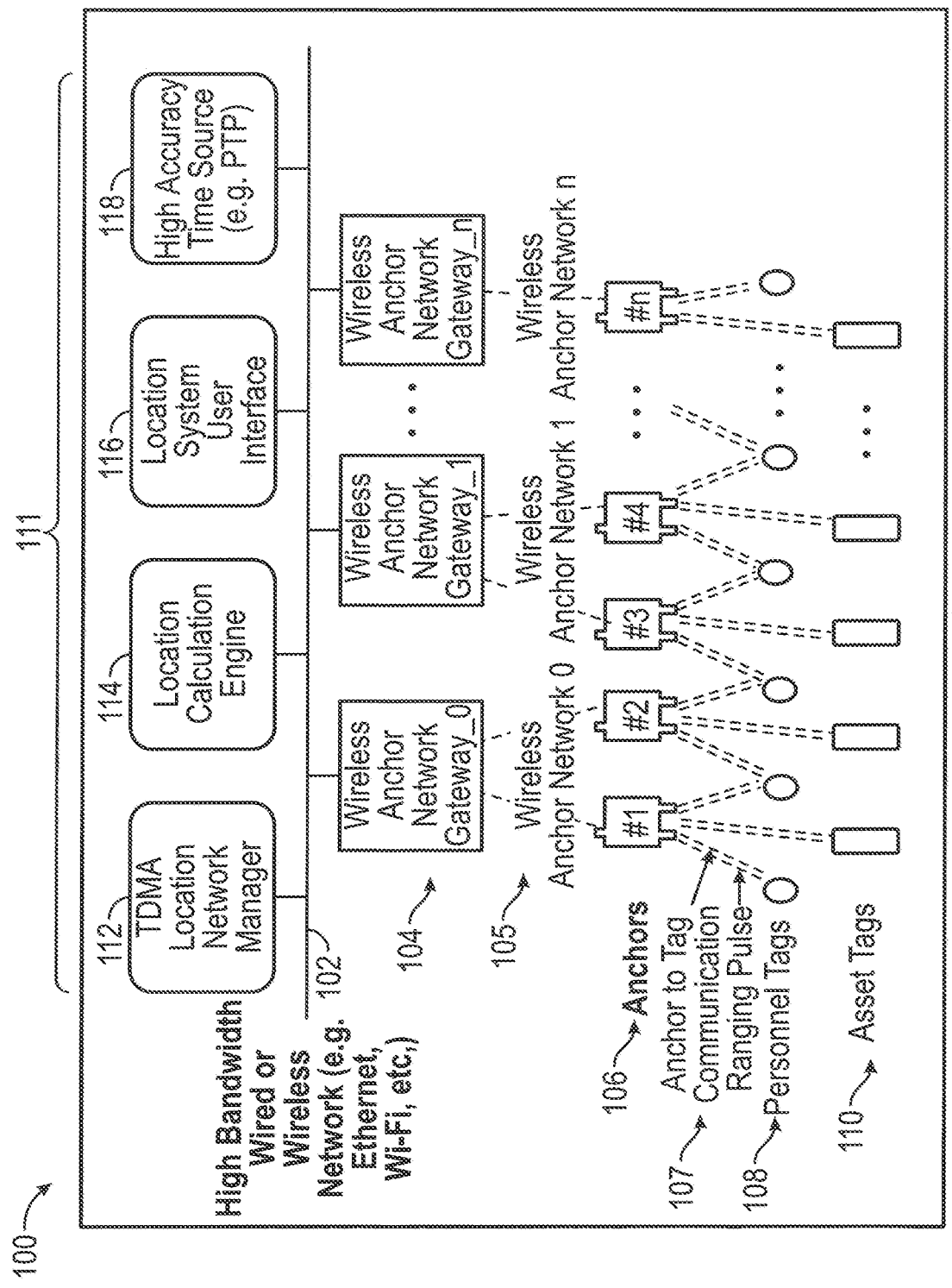
FIG. 1 is a location awareness system diagram.

FIG. 1 shows a simplified block diagram of a location awareness system 100 according to an embodiment of the present disclosure. System 100 comprises in one embodiment a network 102 to which further components of the system 100 are coupled. Network 102 may be, for example, a high bandwidth wired or wireless network, such as Ethernet, Wi-Fi, or the like. A plurality of wireless anchor network gateways 104 are coupled to the network 102, and each wireless anchor network gateway 104 provides a wireless anchor network 105. A plurality of anchors 106 are coupled to each wireless anchor network gateway 104 through the wireless anchor networks 105. Personnel tags 108 and asset tags 110, which are associated respectively with system personnel and system assets, are in wireless communication with one or more anchors 106 with ranging pulses, such as are described in greater detail below.

In addition to the wireless anchor network gateways 104 that are coupled to the network 102, additional software and/or hardware used to provide support for the wireless anchor network gateways 104 is also coupled to the network 102. In one embodiment, components coupled to the network 102 comprise a network operating element 111 which includes in one embodiment time-division multiple access (TDMA) location network manager 112, a location calculation engine 114, a location system user interface 116, and a time source 118, each of which is described in greater detail below. The components 112, 114, 116, and 118 are used in one embodiment to provide timing information and operation for the system in conjunction with ranging information for the tags 108, 110 received through anchors 106 and wireless network anchor gateways 104.

TDMA is a known standard for sharing a frequency channel on a network, by dividing the signal into multiple time slots. Each wireless network anchor gateway 104, for example, may share the frequency being used for communication signals by being assigned a specific time slot for transmissions. Time slots for wireless network anchor gateways 104 are in one embodiment assigned by the TDMA location network manager 112. Any appropriate communication technique may be employed including CDMA techniques or other time and/or frequency slotting or sharing techniques.

In one embodiment, anchors 106 are distributed around an area, such as a manufacturing facility, in one embodiment in a grid pattern that covers the area to be monitored. In one embodiment, anchors 106 are distributed about a facility in a grid pattern with spacing of about 50 meters. Personnel tags 108 and asset tags 110 range to the grid of anchors in one embodiment using signal strength on an anchor to tag communication network 107. Based on the strength of ranging signals of tags 108 and 110 to the grid of anchors 106, the positions of tags 108 and 110 are ranged by the anchors 106. Anchor to tag communication or network 107 may use a series of ranging pulses and communication on a network such as the mesh networks described herein, or on another network such as an ultrawide band network or the like.

Once anchors 106 have the ranging data to the plurality of tags 108 and 110, the range data is conveyed within the system 100 to their respective gateways 104 via the plurality of wireless anchor networks 105. In one embodiment, the gateways 104 are also arranged in a grid pattern that covers the area to be monitored. In one embodiment, gateways 104 are distributed about a facility in a grid pattern with spacing of about 200 meters. The gateways 104 receive ranging information from the anchors 106, and convey that ranging information within system 100 to components coupled to the network 102.

Personnel tags 108 and asset tags 110 range to the grid of anchors in one embodiment using signal strength. Based on the strength of ranging signals of tags 108 and 110 to the grid of anchors 106, the positions of tags 108 and 110 are ranged by the anchors 106. Ranging data from the tags 108, 110 is passed to location calculation engine 114 for determining positioning of the tags 108, 110 relative to each anchor 106. Location may then be determined based on a known location of the anchors 106.

Location Awareness System Overview:

As shown and described above, the system 100 uses a matrix of low power anchors 106 that are mounted to fixed points within a facility. These anchors 106 are in one embodiment battery powered wireless devices which can be deployed for a fraction of the cost of other types of anchors that must be wired to power and communication lines. The costs of running wires in a hazardous plant environment can easily dwarf the cost of the anchors themselves.

The anchors 106 of the various embodiments within system 100 may employ any of a number of industrial or commercial wireless communication technologies including but not limited to TEC 62591 (WirelessHART) and TEC 62734 (ISA100.11a). The WirelessHART protocol was designed specifically to address the challenging environment that exists in most industrial plants including heavy infrastructure, electrical noise, congested RF bands, and the presence of flammable and explosive materials. The location awareness system 100 builds on self organizing multi-hop mesh protocols such as WirelessHART by taking advantage of the accurate timing of these TDMA-based protocols to produce an orthogonal schedule for conducting single or multi-spectral ranging to a large number of mobile personnel tags 108 and asset tags 110. Time division multiple access uses ultra-low power, time deterministic ranging to a large number of tags 108, 110 in a congested RF environment. The schedule makes it possible for both tags 108, 110 and anchors 106 to synchronize their operations (communicating and ranging) for high efficiency.

To allow the system 100 to cover a user's entire facility, more than one wireless anchor network 105 is likely to be deployed from more than one wireless anchor network gateway 104. When multiple wireless anchor networks 105 are employed at a facility, the location awareness system 100 maintains a shared sense of time between components. In one embodiment, the system-global sense of time along with a schedule generated by the TDMA location network manager 112 and transmitted to the anchors 106 and tags 108, 110 makes it possible for the system 100 to operate very efficiently with many tags 108, 110 without self-interference.

Location Network Timing Detail:

The TDMA location network manager 112 communicates its timing information to each anchor 106 and tag 108, 110. For example, using an available precision time source 118 (e.g. using a Precision Time Protocol—PTP source connected to the network 102), the TDMA location network manager 112 timestamps the beginning of its first schedule slot. Each subsequent slot is a precise duration (e.g. 10 ms) and is numbered sequentially. This timestamp is propagated to each anchor 106 and tag 108, 110 through the wireless anchor networks 105 and the anchor to tag communication network 107. The anchors 106 and tags 108, 110 use this information to time align their local anchor to tag transmit, receive, and ranging slots as programmed by the TDMA location network manager 112.

The anchors 106 maintain their sense of time using the wireless anchor networks 105 which also provide timing information for a particular schedule slot on demand. This continuously updated time is shared between the anchors 106 and tags 108, 110 to maintain alignment over time and temperature for all constituents of the location awareness system 100.

Location calculation engine 114 works in conjunction with TDMA location network manager to determine position locations for the tags 108, 110, with the ranging information received along network 102 from the wireless anchor network gateways 104 via anchors 106 from tags 108, 110. Location system user interface 116 allows a user to see and use ranging and position information for operations and the like within a facility.

Time is passed from a central time source 118 over the network 102 to the wireless anchor network gateways 104. Gateways 104 pass the time on to the anchors 106 over wireless anchor networks 105. Anchors 106 pass the time on to the tags 108, 110 on network 107. Once all components of system 100 have a common sense of time, operation of the system is made with time synchronized communications and ranging.

For example, synchronization could be accomplished by sending time pulses at a very high rate, such as once every microsecond. However, such a high rate of sending time pulses is power intensive, and with many anchors 106 operating on at least partial battery power, is inefficient and wasteful. Instead, time pulses are sent in one embodiment less frequently (for example, once per minute to maintain acceptable timing guardbands), and use a microprocessor clock to perform between-pulse timing. In one embodiment, in order to achieve target battery life, a 1 ms time synchronization may be used across different anchor networks. Microprocessors may be employed in anchors, 106, wireless anchor network gateways, and the like, and can provide timing signals for some amount of time. However, over time, microprocessor clocks can drift, and a synchronized clock is used to refresh the timing of microprocessor clocks on a regular basis. In one embodiment, this is done with propagation of a timing signal from precision time source 118 over network 102 to wireless anchor network gateways 104, over networks 105 to anchors 106, and over network 107 to tags 108, 110.

Figure 2:
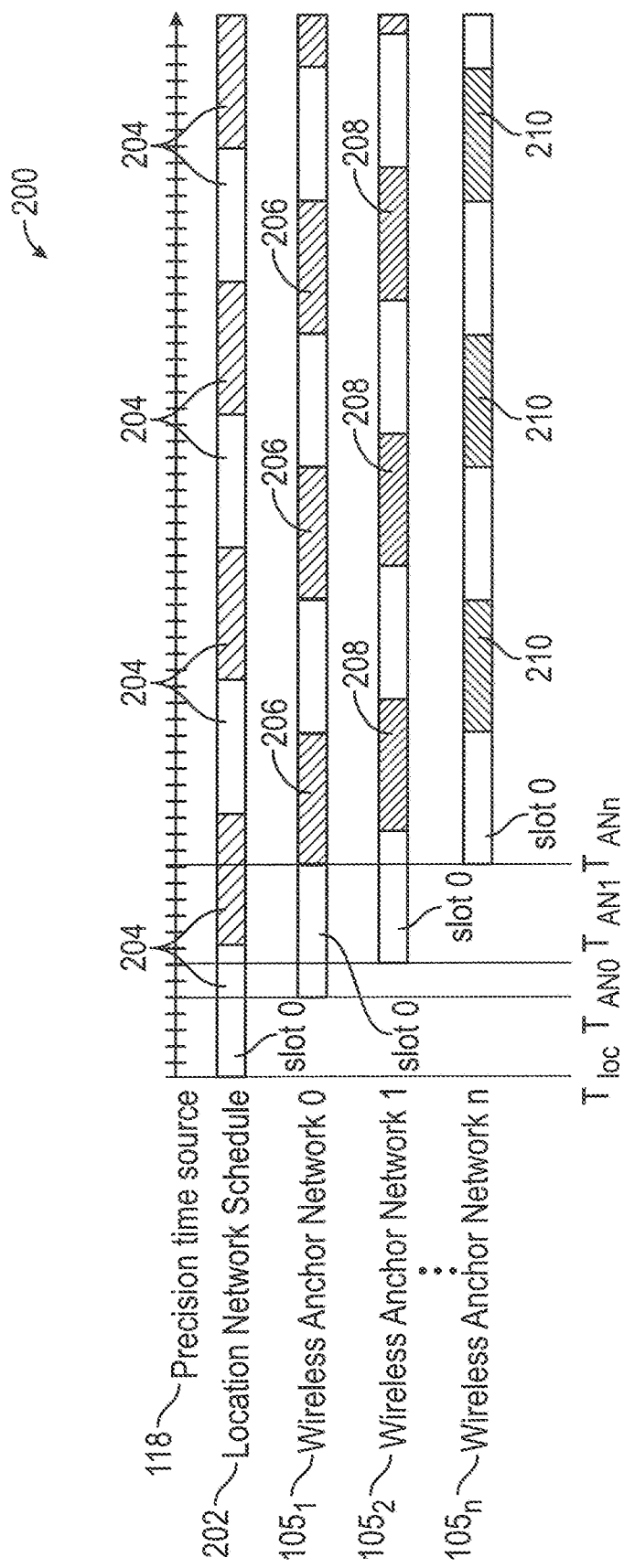
FIG. 2 is an example location and wireless anchor network time alignment.
Figure 3A:
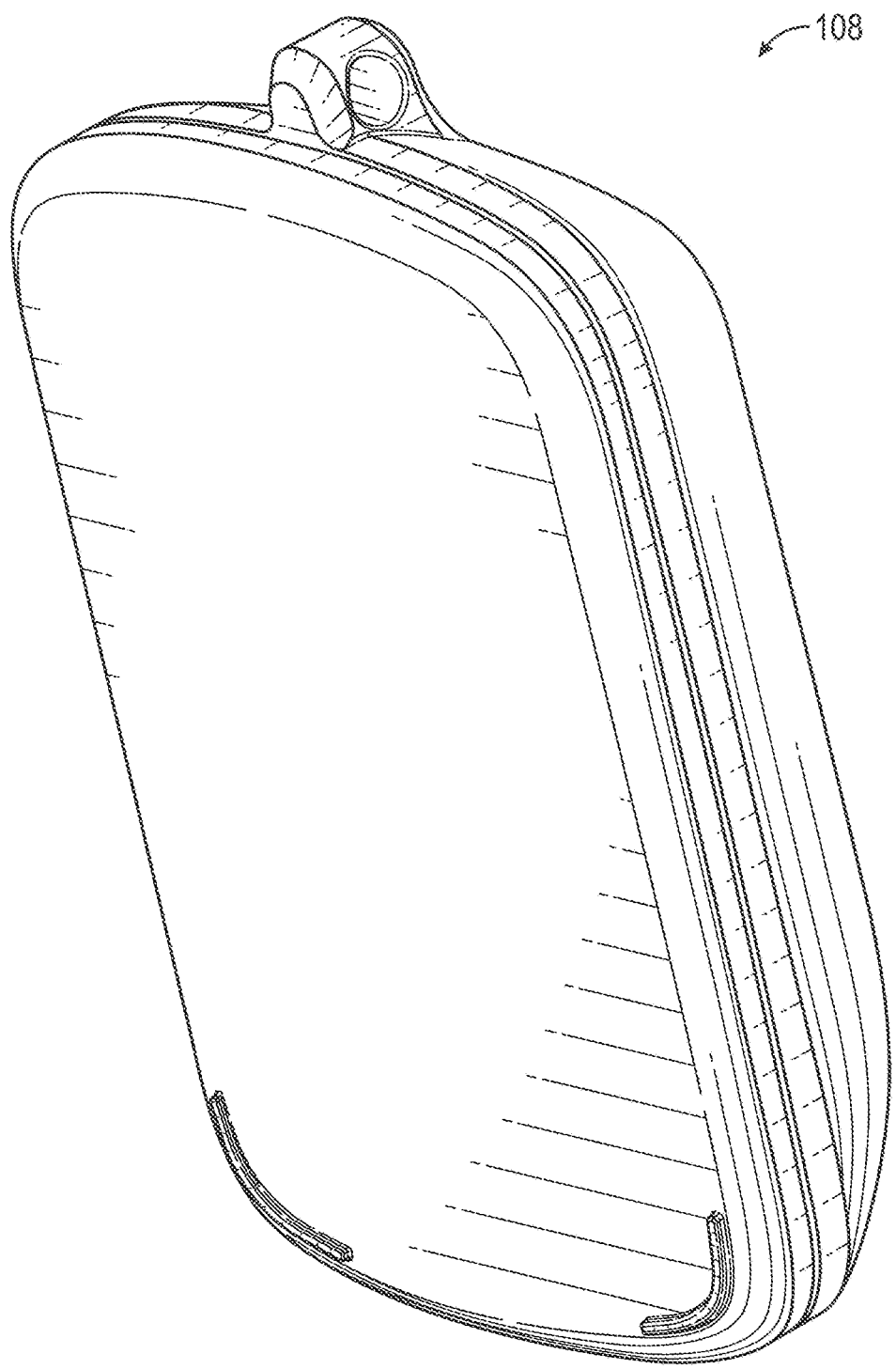
FIG. 3A is a rear isometric view of a personnel location tag design example.
Figure 3B:
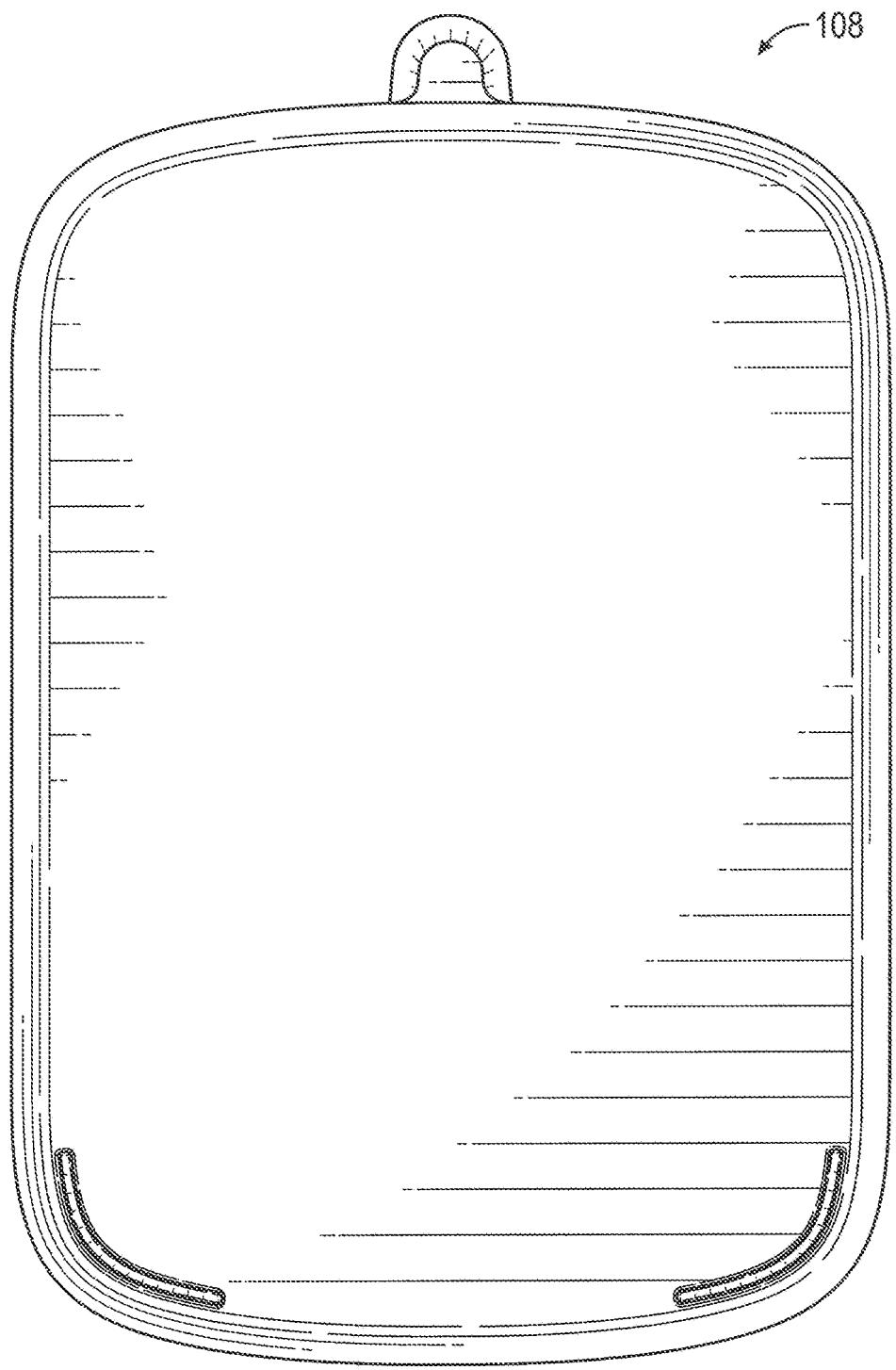
FIG. 3B is a rear elevation of the personnel location tag design of FIG. 3A.
Figure 3C:
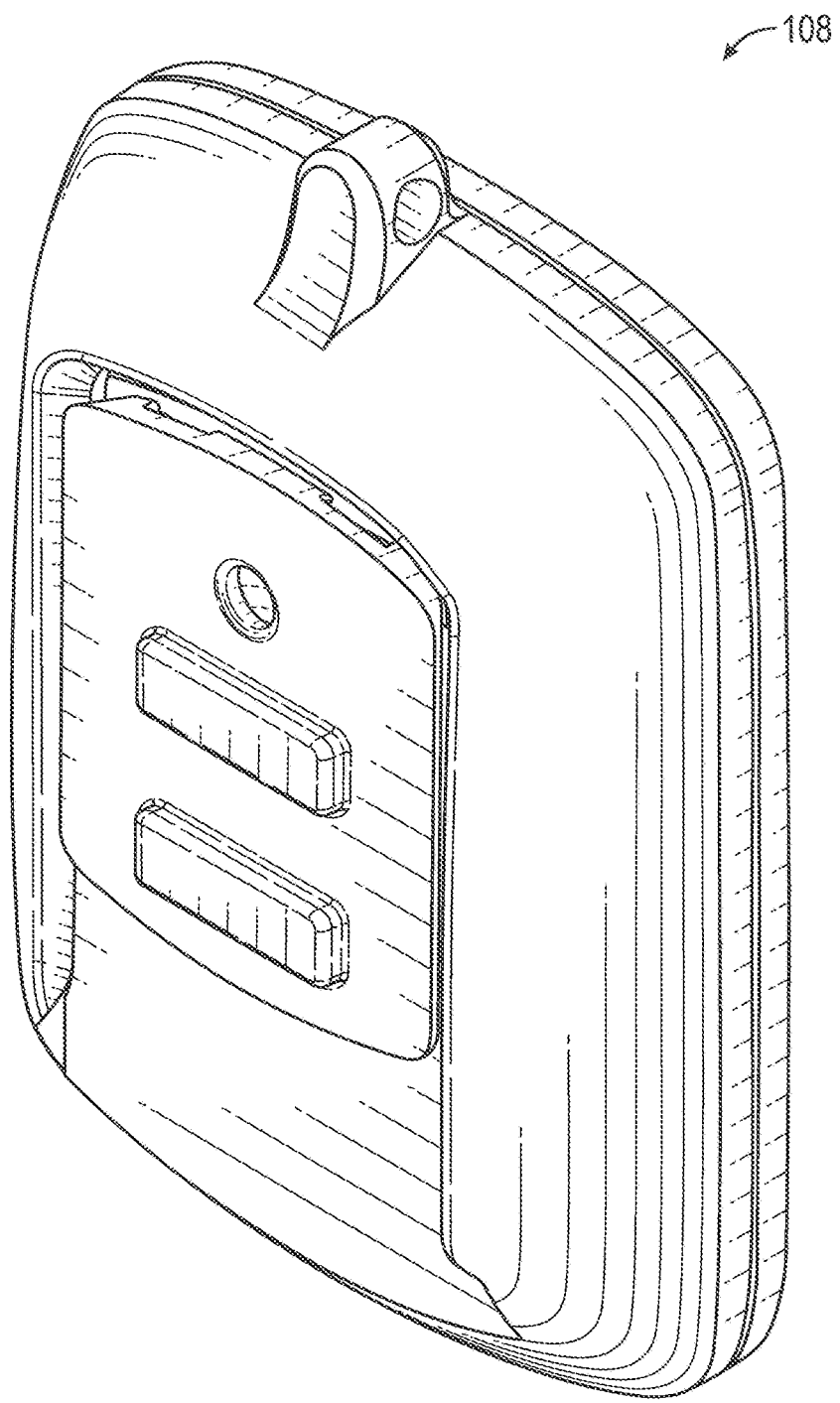
FIG. 3C is a front isometric view of the personnel location tag design of FIG. 3A.
Figure 3D:
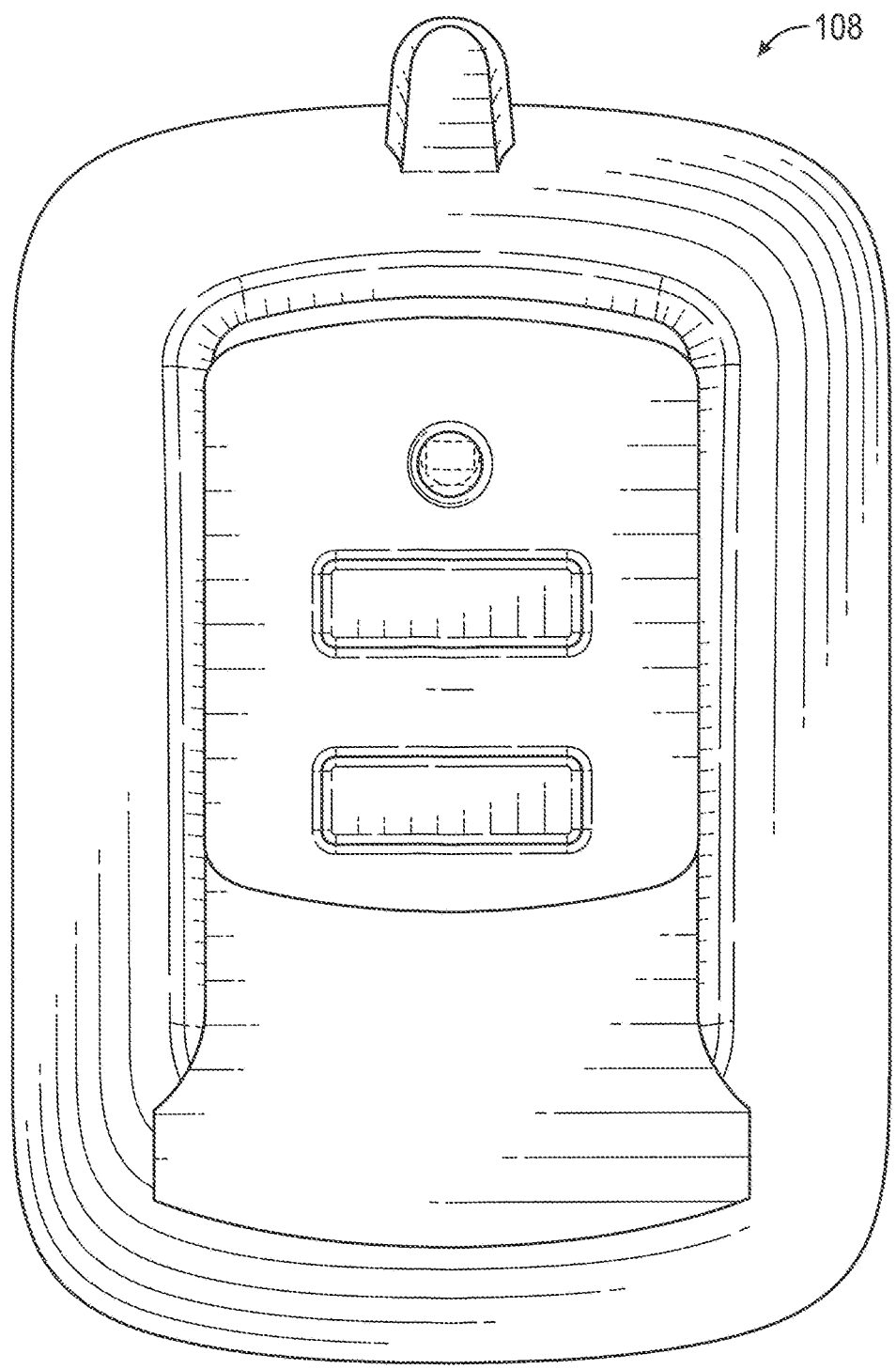
FIG. 3D is a front elevation view of the personnel location tag design of FIG. 3A.
Figure 4A:
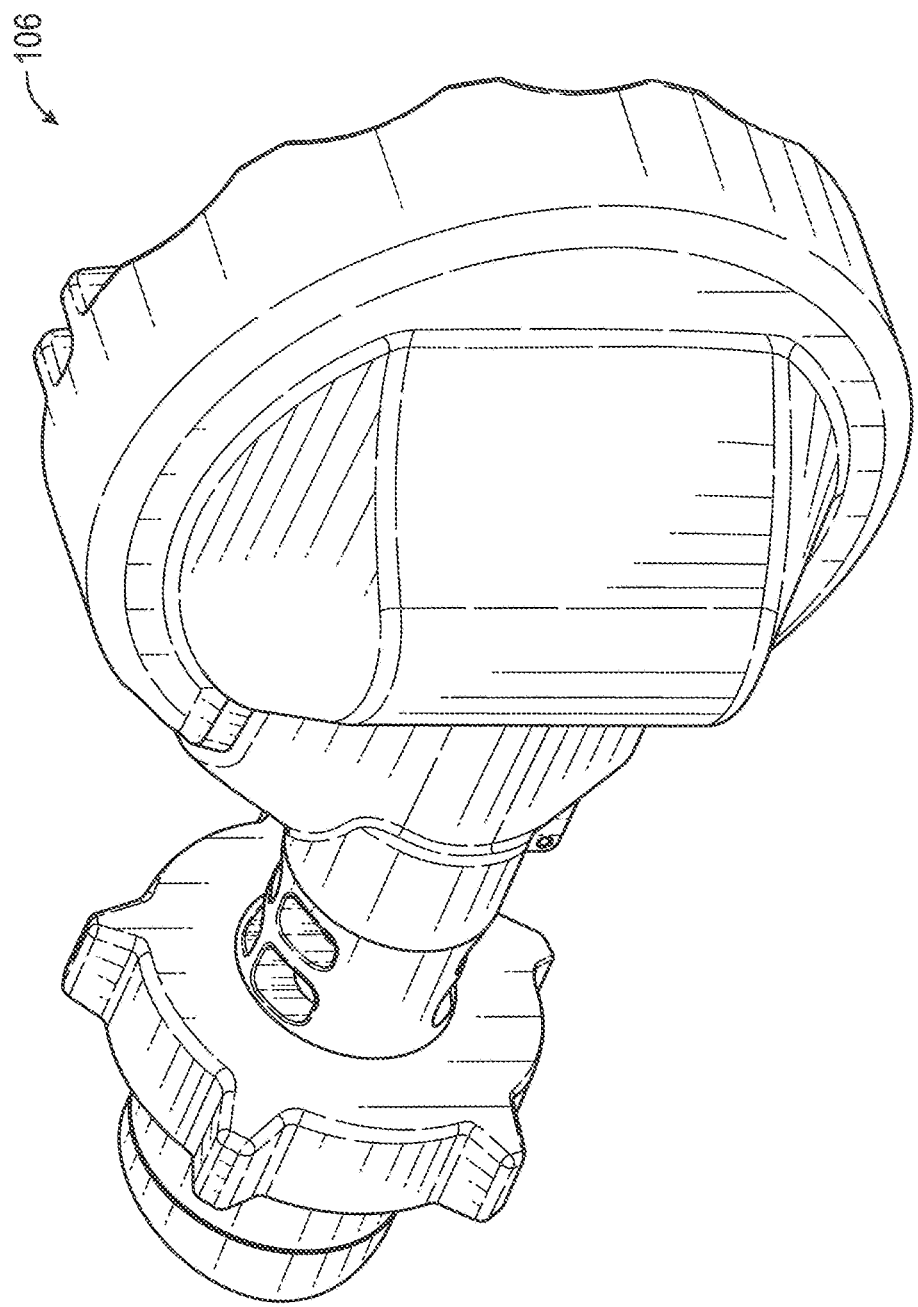
FIG. 4A is a rear isometric view of a location anchor design example.
Figure 4C:
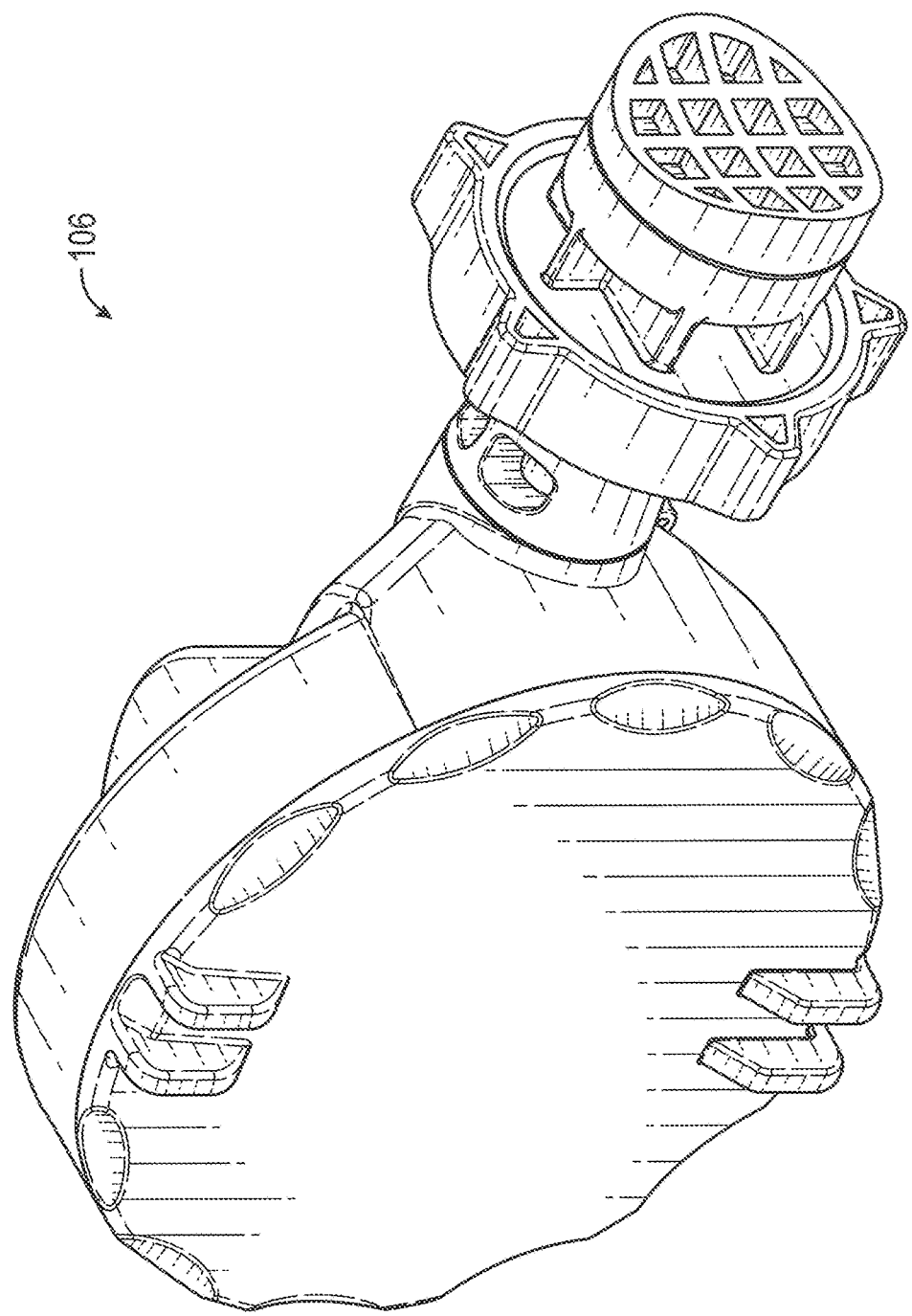
FIG. 4C is a front isometric view of the location anchor design of FIG. 4A.
Figure 4D:
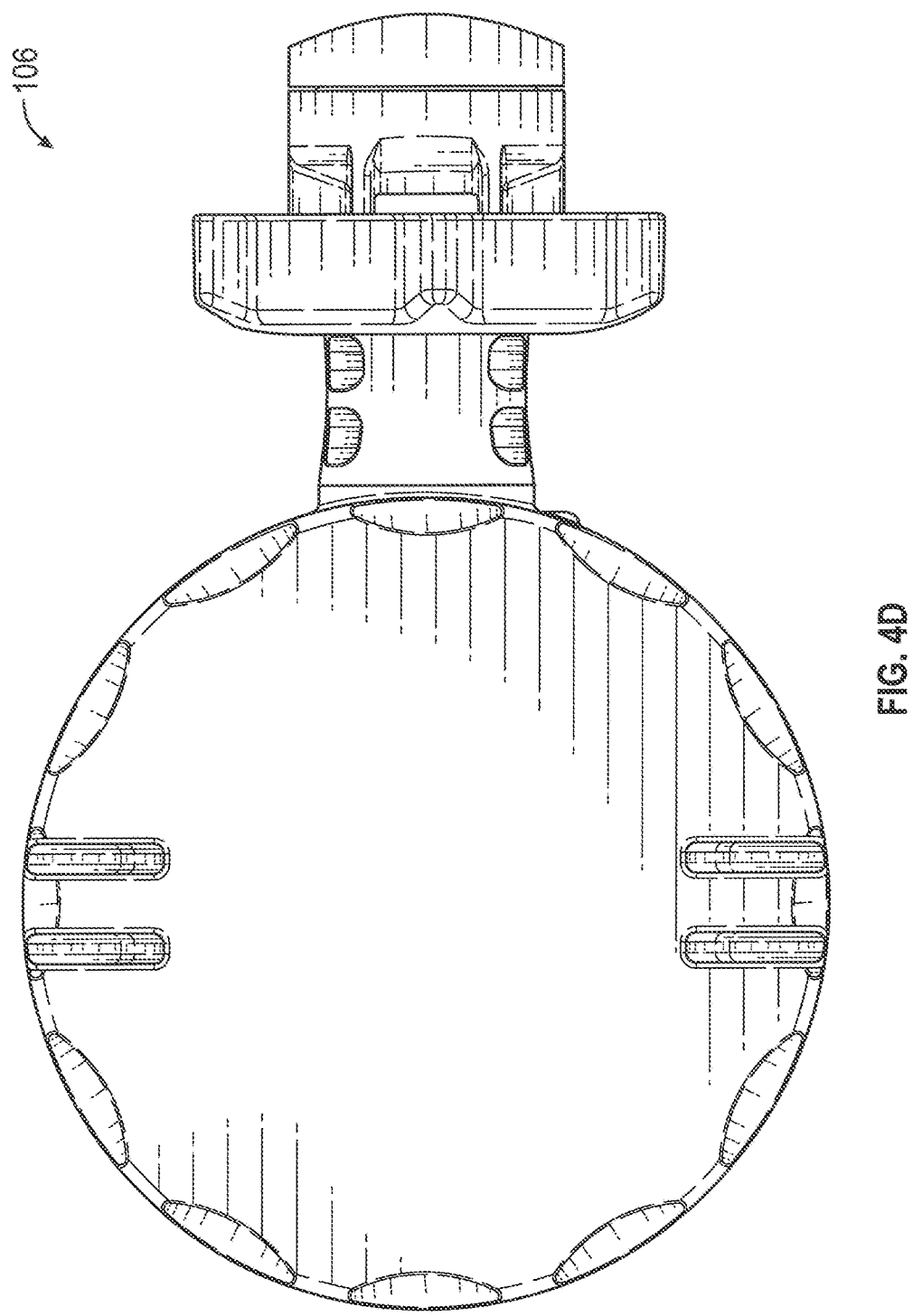
FIG. 4D is a front elevation view of the location anchor design of FIG. 4A.

FIG. 2 shows the use of a system 100 global precision time source (e.g., 118) to align the location network schedules of independent anchor networks 105 within system 100. An anchor 106 local sense of time may be corrected to a location network schedule provided by TDMA location network manager 112 and precision time source 118, using an anchor network specific offset value ($T_{AN0}$, $T_{AN1}$, etc.).

Ranging Spectrum:

In one embodiment of the system 100, anchors 106 and tags 108, 110 communicate and range using a different part of the radio frequency (RF) spectrum than the wireless anchor networks 105 and therefore, the tag location communication or network 107 does not use any knowledge of the wireless anchor network 105 schedule. For example, the wireless anchor networks 105 may use 2.4 GHz industrial scientific and medical (ISM) portion of the RF spectrum. In this configuration, communication and ranging between anchors 106 and tags 108, 110 is done in another portion of the RF spectrum such as the unlicensed 900 MHz (U.S.) or 860 MHz (EU) bands. In another embodiment, the anchors 106 and tags 108, 110 range and communicate using wideband, ultra-wide band or ultrasonic spectrum communications. The use of a completely different spectrum to range and communicate between the anchors 106 and tags 108, 110 makes it possible for the wireless anchor network schedule and the location network schedule to be completely independent and overlapping, while still achieving high efficiency operation that is free from interference.

In another embodiment, the system 100 has anchors 106 and tags 108, 110, as well as wireless anchor networks 105, sharing the same spectrum (in one embodiment, the 2.4 GHz band). Such an embodiment simplifies global deployments. The 2.4 GHz band is globally harmonized, while sub-GHz bands are not. In the case of an overlapping spectrum, more efficient sharing may be accomplished, for example, by employing blacklisting features of WirelessHART.

As shown in FIG. 2, precision time source 118 keeps a precision time that is used for synchronization of system 100. Propagation of a precision time signal from the precision time source 118 is provided on a location network schedule 202 having slots 204 of a certain predetermined time duration. Wireless anchor networks $105_1$, $105_2$, . . . , $105_n$, have anchor network specific offset values $T_{AN0}$, $T_{AN1}$, . . . , $T_{ANn}$) that allow all wireless anchor networks to operate on the same time schedule. For example, wireless anchor network $105_1$ operates in slots 206, wireless anchor network $105_2$ operates in slots 208, and wireless anchor network $105_n$ operates in slots 210, with the timing for each of the wireless anchor networks 105 synchronized as discussed. The shared known timing is passed from wireless anchor networks 105 to anchors 106 and then to tags 108, 110 as synchronization occurs.

Figure 5:
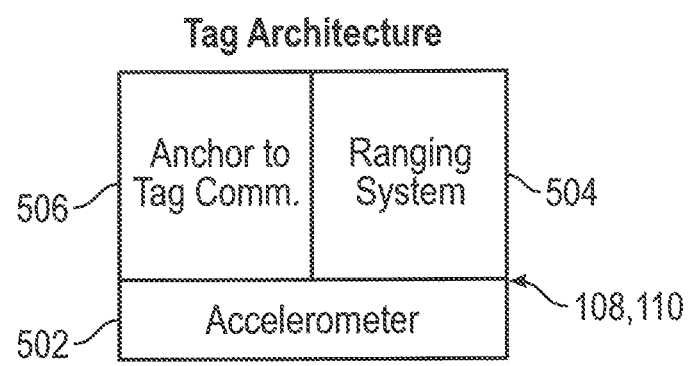
FIG. 5 is a schematic view of a tag architecture.

System 100 Component Details:

Tags (personnel 108 or asset 110):

Tags 108, 110 are in one embodiment low power electronic devices that are attached to personnel (tags 108) and critical assets (tags 110) within the plant or facility. Rear isometric, rear elevation, front isometric, and front elevation views of a design of a representative personnel tag 108 are shown, respectively, in FIGS. 3A, 3B, 3C, and 3D. A block diagram of one architecture embodiment of tag 108, 110 is shown in FIG. 5. FIG. 5 shows tag 108, 110 comprising an accelerometer 502, a ranging element or system 504, and an anchor to tag communication element 506. Operation of tags 108, 110 is known and will not be described further herein.

Power for tags 108, 110 is provided in one embodiment by a primary or secondary cell battery. When a secondary cell battery is used, it may be recharged in various ways including but not limited to plug-in and inductively coupled proximity charging. In order to extend battery life, in one embodiment the tags 108, 110 include accelerometer 502 or other component to allow the tag to enter a low power sleep state when it has been stationary for a specified time period. When in the low power stationary state, the tag 108, 110 can report its position at a significantly reduced rate.

Each tag includes a ranging module 504 compatible with one or more of the ranging modules in the deployed anchors 106. Ranging capabilities may include one or more of the following:
  a. narrow band RF signal strength
  b. narrow band RF time of flight (one-way and two-way)
  c. narrow band RF beaconing
  d. wide band RF signal strength
  e. wide band RF time of flight (one-way, two-way, and three-way)
  f. wide band RF beaconing
  g. GPS
  h. ultrasonic time of flight (one-way and two-way)
  i. hybrid narrow band. RF and ultrasonic where the narrow band. RF pulse is used for time synchronization between the tag and the anchor
  j. combinations of the above techniques Tags 108, 110 may further include components to support dead reckoning location awareness such as but not limited to gyroscopes, magnetometers, and accelerometers (502). Tags 108, 110 may also contain proximity detection hardware such as an RFID tag or an inductive coupling to a fixed exciter positioned at a gate or doorway of the facility or section of the facility. Data from these components may or may not be filtered in the tag 108, 110 prior to transmission over the anchor to tag communication network 107. Ranging and dead reckoning data is transmitted to one or more wireless anchor network gateways 104 and then to the location calculation engine 114 over network 102 for processing along with other ranging information to establish a high-confidence location for the tags 108, 110.

In one embodiment, tags are provisioned out of band (using non-operational means) to securely join the location awareness system 100. A tag is provided with a unique ID that is then associated with a particular asset or personnel. When entering operation, the tag 108, 110 reports its presence to the TDMA location network manager (TLNM) 112 using a secure location join key.

As tags 108, 110 may be deployed in hazardous locations, tags are designed in one embodiment as self-contained battery powered intrinsically safe devices. The tags 108, 110 may also adhere to electrical equipment shock and fire hazard requirements as well as electromagnetic compatibility (EMC) and spectrum usage requirements.

In additional embodiments, tags may incorporate other features such as status indicators (e.g. LED) indicating the health of a tag 108, 110 as well as the state of its internal battery. The tags may also incorporate measurement functions to detect environmental parameters such as temperature, humidity, and gas concentration. Personnel tags 108 may also incorporate biometric measurements such as heart rate, respiration rate, skin temperature, body position and the like. Tags may also incorporate a panic button that a user can activate to request assistance. All of the parameters mentioned above are communicated back to a host system using the anchor to tag networks 107 and wireless anchor networks 105. The host system can then take action such as notifying plant emergency response and safety personnel.

Figure 6:
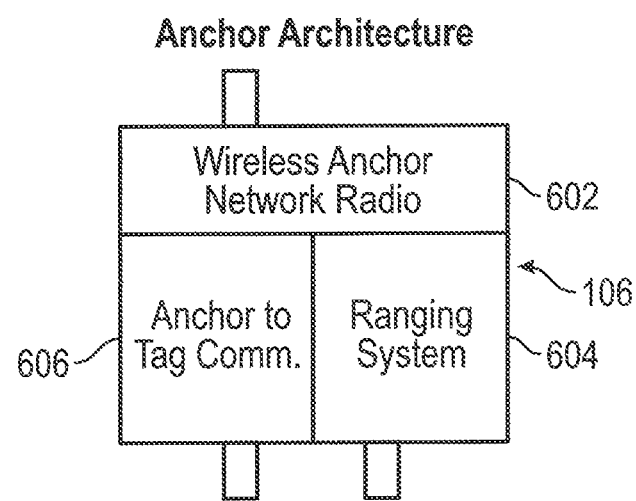
FIG. 6 is a schematic view of an anchor architecture.

Rear isometric, rear elevation, front isometric, and front elevation views of a design of a representative anchor 106 are shown, respectively, in FIGS. 4A, 4B, 4C, and 4D. A block diagram of one architecture embodiment of anchor 106 is shown in FIG. 6. FIG. 6 shows anchor 106 comprising a wireless anchor network radio 602, a ranging element or system 604, and an anchor to tag communication element 606.

Anchors 106 are in one embodiment battery or line powered devices that have fixed and known positions. Anchors 106 securely communicate with tags 108, 110 within range and use single or multi-spectral means to determine the distance from the anchor 106 to each tracked tag 108, 110. In one embodiment, anchors 106 are members of an industry standard mesh network used to relay tag ranging and health information to a location calculation engine 114.

To be cost effective, an anchor 106 may be a self-contained battery powered wireless device with battery life in the range of 5 to 10 years. The development and use of such anchors 106 helps overcome a major cost drawback of existing systems. Many existing systems rely on expensive to purchase and install wired equipment such as industrial grade Wi-Fi access points. Anchors 106 could also be line powered when reliable d.c. power is available. For example, anchors 106 may be integrated into industrial lighting systems.

In one embodiment, anchors 106 communicate with the tags 108, 110 over a network or networks 107 using a variety of ways including narrow and wide band RF. The anchors 106 may form a network with each other using existing wireless sensor field protocols such as WirelessHART, ISA100, or BLE Mesh. In one embodiment, this communication uses a frequency band different from that used to communicate and range between the tags 108, 110 and anchors 106. This avoids any coexistence issues between these two parts of the system 100.

Anchors 106 employ ranging techniques matching those of the tags 108, 110 in the system. Additionally, anchors 106 may periodically range to each other to continuously assess important characteristics affecting range measurement in the local area. For example, anchors may use RF signal strength measurement between themselves to continuously assess changes in the RF environment including propagation, reflection and absorption coefficients. Since the fixed position of each anchor is known to the location calculation engine 114, the anchor to anchor ranging information may be used to continuously improve the range measurement between tags and anchors. Anchors 106 may also incorporate GPS functions to help determine their position without requiring an installer to input this fixed position information.

Each anchor 106 is in one embodiment securely joined to a wireless anchor network 105 using the provisions of the wireless sensor networking protocol that it employs (e.g. WirelessHART or ISA100). During operation, the TLNM 112 establishes a schedule for the anchor 106 to range and communicate with selected tags 108, 110 in the vicinity of the anchor 106. The anchor's participation within the anchor mesh network is independently managed by an anchor network manager which typically runs in an anchor network manager gateway or as a remote application.

As the anchors 106 may be deployed in hazardous locations, they are designed as self-contained battery powered intrinsically safe devices. The anchors 106 may also adhere to electrical equipment shock and fire hazard requirements as well as EMC and spectrum usage requirements.

Embodiments of the present disclosure provide an industrial location awareness system that can accurately track the position of personnel and critical assets. A method of using industrial TDMA wireless communication protocols (e.g., WirelessHART, ISA, 100.11a, BLE, etc.) to form a network of fixed position anchors is also provided. The method provides performance and cost advantages over existing systems such as Wi-Fi based systems, Bluetooth beaconing systems, GPS systems, and dead reckoning systems.

In another embodiment, a method of using accurate timing within industrial TDMA wireless communication protocols provides a global location network schedule, such that a system (e.g., system 100) has more power and bandwidth efficiency and allows the system to track the position of thousands of tags in a single facility without any possibility of self-interference.

In another embodiment, a method of using a frequency spectrum different from that of the anchor communication network to communicate and range between anchors and tags is provided. In such a configuration, the anchor network and location network schedules operate independently by reducing the complexity of the system while increasing bandwidth for both communication and ranging.

In another embodiment, a method of using accurate timing of existing industrial TDMA wireless communication protocols to provide a global location network schedule propagating a shared sense of time to a plurality of wireless anchor networks and a plurality of anchor to tag networks, wherein components of the system including wireless anchor network gateways, anchors, and tags have a shared sense of time and the schedule generated by a location network manager.

Although the present disclosure has been described with reference to preferred embodiments, workers skilled in the art will recognize that changes may be made in form and detail without departing from the spirit and scope of the disclosure.

What is claimed is:

1. A location awareness system, comprising:
    a communication network;
    a network operating element coupled to the communication network;
    at least one anchor network gateway coupled to the communication network, the at least one anchor network gateway configured to generate a wireless anchor network;
    a plurality of nodes separate from the network operating element, wherein the plurality of nodes comprises:
        a plurality of anchors configured to couple directly to one of the at least one anchor network gateway via its respective wireless anchor network; and
        a plurality of tags, each tag configured to communicate with at least one anchor to provide ranging information for determination of a position of the tag within an area covered by the system;
    wherein the network operating element comprises: a time source independent of the plurality of nodes and a time division multiple access location network manager (TLNM) configured to operate the system, the time source configured to provide timing information to the TLNM and through the TLNM provide timing information to the plurality of nodes for operation of the system in conjunction with ranging information from the plurality of tags received through the plurality of anchors and the at least one network anchor gateway;
    wherein the timing information is passed from the time source to the TLNM and over the communication network to the wireless anchor network gateway and the wireless anchor network gateway passes the timing information on to the anchors over the wireless anchor network; and
    wherein the tag to anchor communication operates on a time schedule that is independent from a time schedule for operation of the wireless anchor network.

2. The system of claim 1, wherein the at least one wireless anchor network and the tag to anchor communication are done within different non-interfering frequency ranges.

3. The system of claim 1, wherein the network operating element further comprises:
    a location calculation engine configured to determine positions for the plurality of tags from the ranging information and known locations of at least one of the plurality of anchors; and
    a location system user interface.

4. The system of claim 3, wherein the TLNM is configured to establish a schedule for the plurality of anchors to range and communicate with tags.

5. The system of claim 4, wherein the TLNM is configured to timestamp a beginning of a first schedule slot for the schedule.

6. The system of claim 5, wherein the TLNM is configured to propagate the timestamp to each anchor and tag through the anchor network and the tag to anchor communication.

7. The system of claim 3, and further comprising an additional anchor network connected to the communication network, the additional anchor network operating using the network operating element and the time source.

8. The system of claim 7, and further comprising additional anchor network gateways operating using the network operating element and the time source.

9. The system of claim 1, wherein the network operating element comprises at least one of:
    a location calculation engine configured to determine positions for the plurality of tags from the ranging information and known locations of at least one of the plurality of anchors; or
    a location system user interface.

10. The system of claim 1, wherein the anchors are low power anchors.

11. The system of claim 10, wherein the anchors are battery powered.

12. The system of claim 1, wherein the plurality of tags comprises self-contained battery powered intrinsically safe tags.

13. The system of claim 12, wherein at least one of the plurality of tags includes a status indicator indicating health of the tag and a battery state of the self-contained battery.

14. The system of claim 12, wherein the tags are configured for inductively coupled proximity charging.

15. The system of claim 1, wherein at least one of the plurality of tags includes a measurement element to detect at least one of temperature, humidity, and gas concentration.

16. The system of claim 1, wherein at least one of e plurality of tags is a personnel tag configured to measure biometric information of a user.

17. The system of claim 1, wherein the anchors are integrated into an industrial lighting system.

18. The system of claim 1, wherein each tag of the plurality of tags comprises a housing containing tag communication and ranging components.

19. The system of claim 1, wherein each anchor of the plurality of anchors comprises a housing containing anchor communication and ranging components.

20. A method of position location of a plurality of tags in a system, comprising:
providing a first network with a network operating element coupled to the first network;
providing at least one anchor network gateway coupled to the first network, the at least one anchor network gateway providing an anchor network;
forming a network of a plurality of nodes separate from the network operating element, wherein the plurality of nodes comprises fixed position anchors configured to communicate via ranging with the plurality of tags and directly via the at least one anchor network to the at least one anchor network gateway; and
operating the system using accurate timing provided by the network operating element within networked wireless communication protocols to provide a global location network schedule for the system;
wherein the network operating element comprises: a time source independent of the plurality of nodes and a time division multiple access location network manager (TLNM) configured to operate the system, the time source configured to provide timing information to the TLNM and through the TLNM provide timing information to the plurality of nodes for operation of the system in conjunction with ranging information from the plurality of tags received through the plurality of anchors and the at least one network anchor gateway,
wherein the timing information is passed from the time source to the TLNM and over the communication network to the wireless anchor network gateway and the wireless anchor network gateway passes the timing information on to the anchors over the wireless anchor network, and
wherein the tag to anchor communication operates on a schedule that is independent from a schedule for operation of the wireless anchor network.

21. The method of claim 20, wherein the networked communication protocols are time division multiple access wireless communication protocols.

22. The method of claim 20, wherein operating the system using accurate timing comprises:
establishing a schedule for each anchor to range and communicate with selected tags in the vicinity of the anchor.

23. The method of claim 20, wherein a location network manager coupled to the first network is configured to establish a schedule for the plurality of anchors to range and communicate with tags.

24. The method of claim 23, wherein the location network manager receives accurate time from a time source coupled to the first network.

25. The method of claim 24, wherein the accurate time is refreshed at a rate sufficient to maintain accurate timing within the tags and anchors of the system via the network anchor gateway and the networks of the system.

26. The method of claim 23, wherein the location network manager timestamps a beginning of a first schedule slot for the schedule.

27. The method of claim 26, wherein the timestamp is propagated to each anchor and tag through the anchor network and the tag to anchor communication.

28. The method of claim 20, wherein the at least one anchor network and the tag to anchor communication are accomplished using different non-interfering frequency ranges.

29. The method of claim 20, and further comprising determining, using a location calculation engine coupled to the first network, positions for the plurality of tags from the ranging information and known locations of at least one of the plurality of anchors.

30. A method of ranging a plurality of tags in a system, comprising:
using accurate timing of an existing industrial time division multiple access wireless communication protocol to provide a global location network schedule for the system;
providing a plurality of anchor networks via a plurality of network anchor gateways; and
providing a plurality of fixed location anchors, each anchor directly coupled to at least one of the plurality of network anchor gateways through at least one of the plurality of anchor networks, the plurality of anchors providing a plurality of tag to anchor networks;
wherein the plurality of tags and the plurality of anchor networks have a shared sense of time;
wherein the shared sense of time is provided by a separate time source configured to provide timing information to a time division multiple access location network manager (TLNM) configured to operate the system in conjunction with ranging information from the plurality of tags received through the plurality of anchors and the plurality of network anchor gateways,
wherein time is passed from the separate time source to the TLNM and to the anchor network gateways and the anchor network gateways pass the time on to the anchors over the plurality of anchor networks, and
wherein the tag to anchor communication is independent from schedule of the wireless anchor network.

31. The method of claim 30, wherein communication on the plurality of anchor networks and the plurality of tag to anchor networks is accomplished on different frequency ranges.

32. The method of claim 30, wherein communication on the plurality of anchor networks and the plurality of tag to anchor networks is accomplished in a shared frequency range.

33. The method of claim 30 including transmitting the shared sense of time and a schedule generated by a location network manager to anchors and tags.

34. The method of claim 30, and further comprising correcting the shared sense of time to a location network schedule provided by a time division multiple access network manager and the time source using an anchor network offset value.

35. The method of claim 30, wherein a shared sense of time is provided by propagation of a time signal from a time source on a location network schedule having slots of a predetermined tune duration.

36. The method of claim 35, wherein each of the plurality of anchor networks has an anchor network specific offset value configured to allow all wireless anchor networks to operate on the same time schedule.

37. A location awareness system, comprising:
a plurality of tags, a plurality of anchors, and a plurality of anchor network gateways for communication between tags and anchors, the plurality of network anchor gateways providing a plurality of anchor networks, each of the plurality of anchor networks connecting at least one of the plurality of network anchor gateways directly to at least one of the plurality of anchors, and the plurality of anchors providing a plurality of anchor to tag networks;

a network operating element separate from and coupled to the plurality of anchor network gateways; and a communication network coupling the plurality of anchor network gateways to the network operating element;

wherein the network operating element is configured to range the plurality of tags by:

using accurate timing, provided by a time source of the network operating element, of an existing industrial time division multiple access wireless communication protocol to provide a global location network schedule for the system;

wherein the plurality of anchors and the anchor networks have a shared sense of time;

wherein the network operating element comprises: a time source independent of the plurality of tags and from the plurality of anchors and a time division multiple access location network manager (TLNM) configured to operate the system, the time source configured to provide timing information to the TLNM and through the TLNM provide timing information to the plurality of tags and to the plurality of anchors for operation of the system in conjunction with ranging information from the plurality of tags received through the plurality of anchors and the at least one network anchor gateway, wherein the timing information is passed from the TLNM over the communication network to the wireless anchor network gateway and the wireless anchor network gateway passes the timing information on to the anchors over the wireless anchor network, and wherein the tag to anchor communication operates on a schedule that is independent from a schedule for operation of the wireless anchor network.

38. The system of claim 37, wherein the at least one wireless anchor network and the tag to anchor communication are done within different non-interfering frequency ranges.

39. The system of claim 37, wherein the network operating element comprises:

a location calculation engine configured to determine positions for the plurality of tags from the ranging information and known locations of at least one of the plurality of anchors; and a location system user interface.

40. The system of claim 39, and further comprising a communication network coupling the plurality of anchor network gateways to the network operating element.

41. The system of claim 37, and further comprising an additional anchor network connected to the communication network, the additional anchor network operating using the network operating element and the time source.

42. The system of claim 41, and further comprising additional anchor network gateways operating using the network operating element and the time source.

* * * * *